Nov. 30, 1943. T. H. CLARK 2,335,486
HIGH FREQUENCY MEASURING CIRCUIT
Filed June 5, 1942
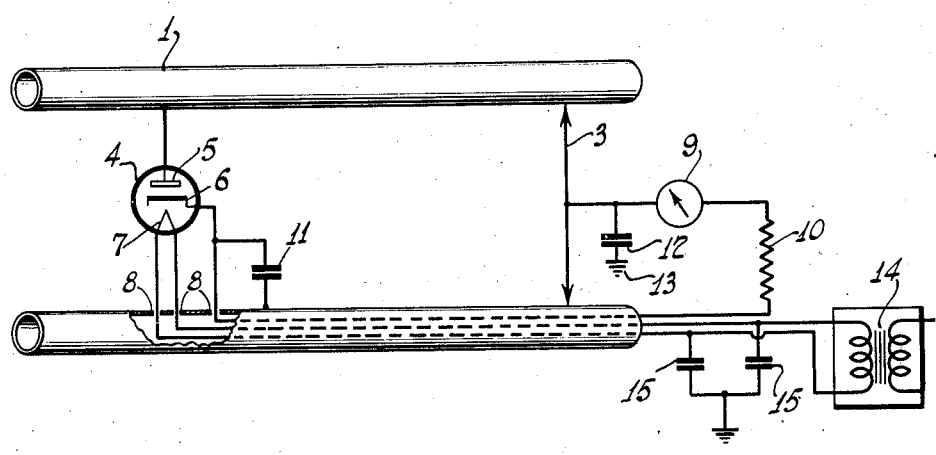
INVENTOR
TREVOR H. CLARK
BY
ATTORNEY Patented Nov. 30, 1943

2,335,486

UNITED STATES PATENT OFFICE 2,335,486

HIGH FREQUENCY MEASURING CIRCUIT

Trevor H. Clark, New York, N. Y., assignor to Radio Corporation of America, a corporation of Delaware Application June 5, 1942, Serial No. 445,98.

5 Claims. (Cl. 171—95)

This invention relates to a new and useful high frequency measuring circuit which is particularly adapted for use in measuring voltages in ultra high frequency circuits.

The object of my present invention is to provide a method and apparatus which allows a single diode voltmeter to measure the voltage across a balanced high frequency line, without destroying the balance in any way.

A feature of this invention is the particular manner in which the circuit elements are associated with a pair of balanced lines, particularly by having the heater and cathode leads of the diode run wholly inside one of the lines.

In ultra high frequency work, it is often necessary to make use of balanced transmission lines. Such a line usually consists of two parallel hollow conductors, such as copper tubes of the appropriate size spaced a suitable distance apart. These lines are used in various ways as tuned circuits of the transmission line type. In the balanced line opposite points of the conductors have potentials symmetrical to ground. In many cases it is desirable to measure the voltage across the line. However, this is very difficult to do without disturbing the symmetry or balance of the line. In a few cases, two diode voltmeters can be connected so that they each affect the conductor to which they are connected in equal amounts. In such a connection, each diode measures the voltage between one conductor of the line and ground. This method of arrangement is only accurate in certain cases, for instance if the ground connections are very short, and in any case it is very difficult to maintain the balanced line. This invention should not be confused with a circuit employing concentric conductors, for in such case the line is not balanced.

This invention will best be understood by referring to the accompanying drawing, which shows a pair of parallel conductors 1 and 2, which are generally composed of thin metallic tubing having good electrical conductivity, the diameter and spacing distance being determined by the physical and electrical requirements of the circuit. Between conductors 1 and 2 there is located a short-circuiting bridge 3, which is arranged to be in sliding contact therebetween. A diode 4, or a triode of the RCA-955 acorn tube type, which has an anode 5, cathode 6 and heater 7, is preferably used in this circuit. The anode 5 is connected directly to the outside of conductor 1. The heater and cathode leads from diode 4 are arranged to run within the inside of conductor 2, passing through suitable insulating bushings 8 in close proximity with diode 4. A meter 9 is connected to the movable shorting bridge 3, and is connected in series with a resistor 10, which connects to cathode 6. Resistor 10 is preferably a resistance having a high value in the order of one megohm, or larger, depending upon the construction of meter 9. A by-pass condenser 11, having very low impedance, is connected from one side of cathode 6 to conductor 2; also, a similar by-pass condenser 12 is connected to ground 13, and the junction of the lead passing between meter 9 and shorting bridge 3. The heater leads connect to a source of voltage supply such as a transformer 14, and has by-pass condensers 15.

The principle of operation of the diode voltmeter, well known in the art, has been described in an RCA publication ST-47, entitled "Electrical Measurements at Wave Lengths Less Than Two Meters," by L. S. Nergaard. However, as mentioned above, I have departed from the conventional method of voltage measurements by having the heater and cathode leads located within one of the lines. In this way, all standing waves on these low frequency and direct current leads are eliminated. The operator is thus allowed to move freely about the meter, as his body capacity has no effect on the meter reading. It will also be seen by this invention that all parts to the right of the bridge 3 shown in the circuit diagram are maintained at ground radio frequency potential. This method of measuring may be used in many ways, such as measuring the power output of oscillators which are generally too small to measure in any other way, and includes measuring the wave length of a high frequency circuit, measuring the amplitude of oscillation voltage in ultra short wave oscillators, and for measuring amplification of high frequency circuits. For example, with this invention, to measure wave length all that is necessary is to move shorting bridge 3 until the maximum value of the rectified voltage appears on meter 9. Then the distance between the point of connection of diode 4 and shorting bridge 3 represents approximately one-quarter of a wave length. If the bridge is then moved until the next maximum is obtained, the distance between the two maximum points is equal to one-half of a wave length. Similarly, the reading of meter 9 will give a measure of the maximum peak amplitude of oscillations across the balanced line composed of conductors 1 and 2.

I have found this method of measuring accurate and convenient, and it can be used in nearly all cases where a voltage measurement is to be taken without disturbing the symmetry of a balanced high frequency line. Therefore, this arrangement should not be limited to the precise arrangement shown.

What is claimed is:

1. A high frequency measuring circuit including a pair of parallel arranged hollow lines, a diode electron discharge device having connections passing through one of said lines, a conductive connection between said pair of lines, said conductive connection being movable along the length of said pair of lines, and an electrical indicating device connected in series between said movable connection and said diode.

2. A high frequency measuring circuit including a pair of parallel arranged hollow lines, an electron discharge device having anode, cathode and heater connections, the anode of said electron discharge device being connected to one of said lines, and the heater and cathode connections passing through the other one of said lines, a movable conductive connection between said pair of lines, said conductive connection being movable along the length of said lines, and an electrical indicating device connected in series from a point on said movable connection and the cathode connection of said electron discharge device.

3. A high frequency measuring circuit including a pair of hollow metallic conductors which are arranged parallel to each other, an electron discharge device having anode, cathode and heater connections located between said conductors, the anode of said electron discharge device being connected to one side of one of said conductors, the cathode and heater leads from said electron discharge device being arranged to insulatingly pass through the other conductor, a conductive shorting bridge arranged between said conductors, said conductive connection being movable along the length of said conductors, a resistance, and an electrical indicating device connected in series between said movable shorting bridge and the cathode connection of said electron discharge device.

4. A high frequency measuring circuit including a pair of hollow metallic conductors which are arranged parallel to each other, an electron discharge device having anode, cathode and heater connections located between said conductors, the anode of said electron discharge device being connected to one side of one of said conductors, the cathode and heater leads from said electron discharge device being arranged to insulatingly pass through the other conductor, a conductive shorting bridge arranged between said conductors, said conductive connection being movable along the length of said conductors, an electrical indicating device connected in series between said movable shorting bridge and the cathode connection of said electron discharge device, and a by-pass condenser connected between said cathode and the said other conductors.

5. A high frequency measuring circuit including a pair of hollow metallic conductors which are arranged parallel to each other, an electron discharge device having anode, cathode and heater connections located between said conductors, the anode of said electron discharge device being connected to one side of one of said conductors, the cathode and heater leads from said electron discharge device being arranged to insulatingly pass through the other conductor, a conductive shorting bridge arranged between said conductors, said conductive connection being movable along the length of said conductors, an electrical indicating device connected in series between said movable shorting bridge and the cathode connection of said electron discharge device, and two by-pass condensers, one by-pass condenser being connected between the cathode of said electron discharge device and one of the conductors, the other condenser being connected between said indicating device and the midpoint of said movable bridge to a point of substantially ground radio frequency potential.

TREVOR H. CLARK.